F. L. HUTCHINSON.
VALVE MECHANISM.
APPLICATION FILED JUNE 5, 1919.
1,422,980.
Patented July 18, 1922.
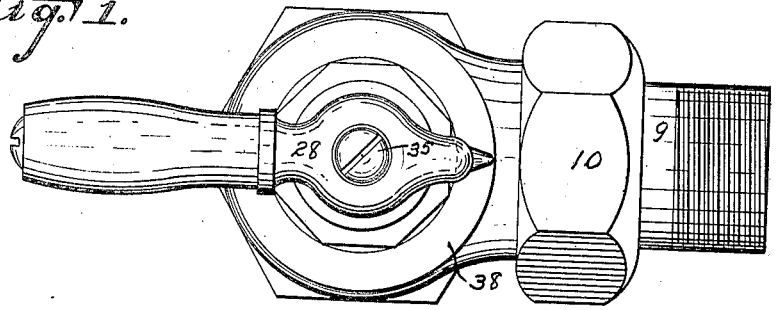
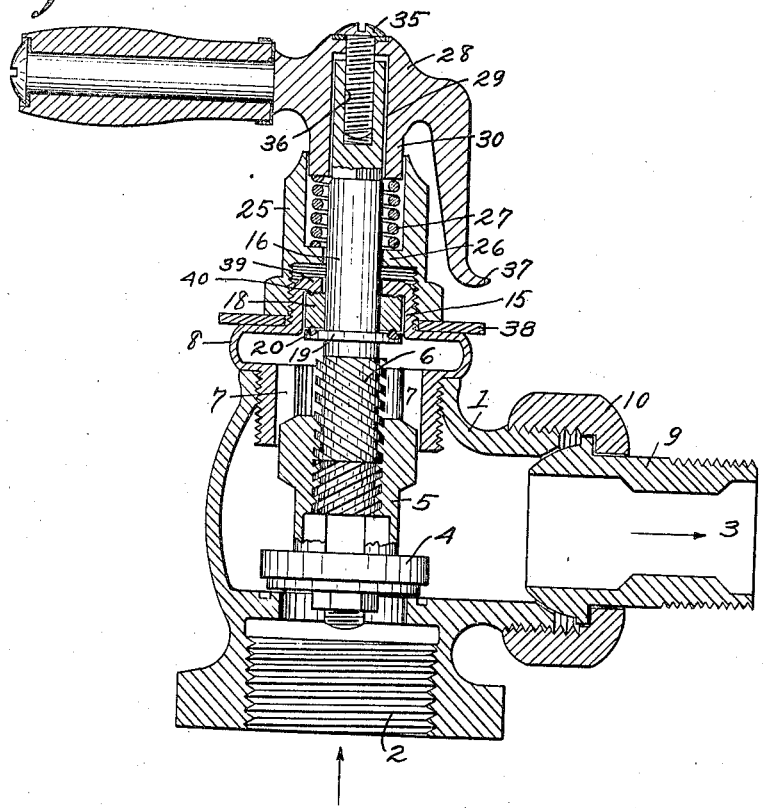
Inventor
Frank L. Hutchinson
By Erwin Wheeler & Woolard
Attorneys
Witness

UNITED STATES PATENT OFFICE.

FRANK L. HUTCHINSON, OF MILWAUKEE, WISCONSIN, ASSIGNOR TO STERLING ENGINEERING CO., OF MILWAUKEE, WISCONSIN, A CORPORATION OF WISCONSIN.

VALVE MECHANISM.

1,422,980.   Specification of Letters Patent.   Patented July 18, 1922.

Application filed June 5, 1919. Serial No. 301,968.

*To all whom it may concern:*

Be it known that I, FRANK L. HUTCHINSON, a citizen of the United States, residing at Milwaukee, county of Milwaukee and State of Wisconsin, have invented new and useful Improvements in Valve Mechanism, of which the following is a specification.

My invention relates to improvements in valve mechanisms, with particular reference to the type of valves or valve mechanisms known as packless valves, adapted for use as main controller valves for radiator systems, whereby the quantity of fluid delivered through a main may be regulated.

The valves in question are not strictly packless, although so-called. Their general object is to provide a form of valve which can be moved to and from its seat without rotation by means of a rotary stem which projects to the exterior of the valve casing, and is provided with an operating handle having a pointer adapted to travel along the face of an index to indicate the degree to which the valve has been opened. In this class of valves the present practice is to dispense with ordinary compressible packings in the form of stuffing boxes to prevent leakage along the stem, by providing the stem with an auxiliary valve adapted to remain continuously seated while the stem is being rotated, and which is adapted to prevent the escape of liquid.

It is customary to provide such auxiliary valves with means for maintaining them under resilient tension or pressure in order that they will take up wear and maintain their efficiency as a means for preventing leakage.

The object of my invention is to provide improved means for maintaining the auxiliary valve under resilient tension in such a manner that it may be made to seat with the pressure of the liquid, and in such a manner that the tension may be adjusted from time to time, as may be required to effectually prevent leakage.

More particularly, my object is to provide means whereby the operating handle may itself be utilized to secure the required seating pressure of the auxiliary valve, and whereby a simple readjustment of the operating handle from time to time may be utilized to increase or diminish such seating pressure in accordance with the requirements. The adjustment may thus be made without detaching any portion of the casing.

In the drawings:—

Figure 1 is a plan view of my improved valve mechanism.

Figure 2 is a vertical sectional view of the same, drawn to a plane intersecting the inlet and outlet ports.

Like parts are identified by the same reference characters throughout both views.

The main casing 1 is provided with an inlet port 2 and an outlet port 3. The main valve 4 closes the inlet port and is provided with a valve head 5 having a socket to receive an adjusting screw 6, the valve seat being suitably guided by a channeled guideway 7 in a cap member 8, which is screw threaded into the top of the casing. All of these parts, together with the outlet coupling member 9 and coupling nut 10, may be of any ordinary construction, and require no further description.

But it will be observed that the cap member 8 is provided with a cylindrical top 15, through the upper end of which the valve stem 16 passes. This cylindrical portion 15 is adapted to receive a hard rubber annulus 18 which surrounds the valve stem, and against the lower surface of which an annular flange 19 on the valve stem is adapted to bear. The flange is preferably provided with an annular rib 20 which seats in a corresponding groove in the hard rubber annulus 18. The tubular nut 25 is screwed upon the exterior surface of the cylindrical member 15, and is provided with an interior flange 26 upon which a coiled spring 27 is seated. The handle 28 is provided with a socket 29 to receive the upper end of the valve stem, the socket and this end portion of the valve stem being square or polygonal in cross section, or otherwise provided with means to prevent the handle from rotating on the stem. The handle is provided with a tubular extension 30 which is adapted to fit within the sleeve nut 25, and bear upon the upper end of the spring 27. A screw 35 passes through the top of the handle and has threaded engagement at 36 in a suitable socket formed in the upper end portion 29 of the valve stem, whereby when this screw 35 is turned downwardly in the socket, the handle is forced downwardly against the spring 27 to increase its tension. By turning the screw 35 in the opposite direction, the tension of the spring will, of course, be diminished.

37 is a pointer to operate in connection with suitable gage marks on the annular shoulder 38, whereby the handle may be rotated, and may transmit rotative motion to the valve stem 16, thereby turning the screw 6 in the head 5 to raise or lower the valve 4.

It will, of course, be understood that the recoil or resilient pressure of spring 27 will be exerted upwardly upon the sleeve portion 30 of the handle, and will be transmitted through the screw 35 to the valve stem 16, thereby drawing the annular flange 19 forcibly against the hard rubber annulus or packing member 38. The packing member or annulus 18 is in turn forced against the top or annular inwardly projecting flange 39 of the member 15, the contacting surfaces of the flange 39 and member 18 being preferably provided with interlocking ribs and grooves to prevent leakage, as indicated at 40.

The general operation of the valve mechanism is well known to all those familiar with this art, and further description is deemed unnecessary, except to point out that my improvement provides for an upwardly seating auxiliary valve or clamping flange 19, in connection with a spring for applying resilient clamping pressure thereto, and means for easily obtaining access to the spring by simply removing the handle, and for adjusting the tension of the spring by simply raising or lowering the handle by adjusting the connecting screw 36.

I claim:—

1. In a valve mechanism, the combination with a valve and a valve casing of a valve operating stem having a screw at one end and a handle at the other end adapted to rotatably actuate the stem, an annular flange on the stem intermediate of its ends, an annular bearing supported by the casing, and against which said flange seats, a relatively stationary stem enclosing member provided with an interior spring seating, and a compression spring mounted on said seating and encircling the stem between the seating and handle; said stem having longitudinally adjustable connection with the handle, and said spring being adapted to press upwardly against the handle to allow said handle to be adjusted in either direction to draw the stem flange against said annular bearing.

2. In a valve mechanism, the combination with a valve casing and a valve therein, a valve operating stem projecting through the casing and having its inner end operatively connected with the valve, a casing extension having an annular packing member through which the stem passes, an annular projection on the stem adapted to seat upwardly against said packing, a handle, a spring coiled about the stem with one end supported from the casing extension and the other end bearing against the handle, said stem being socketed in the handle and connected therewith by an adjusting screw passing through the handle and engaged in an axially disposed socket in the stem, whereby the handle is adjustable longitudinally of the stem.

3. In a valve mechanism, the combination with a valve casing and a valve therein, a valve operating stem projecting through the casing and having its inner end operatively connected with the valve, a casing extension having an annular packing member through which the stem passes, an annular projection on the stem adapted to seat upwardly against said packing, a handle connected with the outer end of the stem and adjustable longitudinally thereof, a spring coiled about the stem with its upper end bearing against the handle, said handle having a tubular portion enclosing the upper end of the stem, and said casing extension having a detachable sleeve enclosing the spring and the lower end of the tubular handle portion, and provided with a seating for the lower end of the spring.

4. In a valve mechanism, the combination with a valve casing, a valve operating stem rotatable about its axis and provided with a handle longitudinally adjustable in either direction, a spring coiled about said stem with one end bearing against the handle and the other end supported by the casing, and cooperating leak preventing members supported by the casing and stem respectively, and adjustably held in pressure relation to each other by the tension of said spring whereby said leak preventing members are seated by the combined action of the fluid controlled by the valve and of said spring.

In testimony whereof I affix my signature in the presence of two witnesses.

FRANK L. HUTCHINSON.

Witnesses:
A. N. GOFF,
M. ANDEL.